United States Patent
Sakuma (10) Patent No.: US 6,317,605 B1
(45) Date of Patent: *Nov. 13, 2001

(54) MOBILE COMMUNICATIONS SYSTEM

(75) Inventor: Shigeru Sakuma, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,806

(22) Filed: Sep. 12, 1997

(30) Foreign Application Priority Data

Sep. 12, 1996 (JP) .................................... 8-241944

(51) Int. Cl.$^7$ ........................................ H04Q 7/20
(52) U.S. Cl. ..................... 455/457; 455/446; 455/566; 701/208
(58) Field of Search .................................. 455/456, 457, 455/68, 419, 69, 412, 432, 556, 435, 404; 701/208, 209, 210, 211, 212; 342/359, 450, 419, 457

(56) References Cited

U.S. PATENT DOCUMENTS

| | | | |
|---|---|---|---|
| 5,121,126 | * | 6/1992 | Clagett ................................ 342/419 |
| 5,432,841 | * | 7/1995 | Rimer ................................. 455/457 |
| 5,502,758 | * | 3/1996 | Tsuzuli et al. ....................... 455/457 |
| 5,548,822 | * | 8/1996 | Yogo .................................... 455/68 |
| 5,613,202 | * | 3/1997 | Ishida et al. ......................... 455/457 |
| 5,873,040 | * | 2/1999 | Dunn et al. .......................... 455/456 |
| 5,873,041 | * | 2/1999 | Ishii .................................... 455/457 |

FOREIGN PATENT DOCUMENTS

| | | |
|---|---|---|
| 1-142899 | 6/1989 | (JP) . |
| 4-204590 | 7/1992 | (JP) . |
| 05026679 | 2/1993 | (JP) . |
| 5-327603 | 12/1993 | (JP) . |
| 06165244 | 6/1994 | (JP) . |
| 6-165244 | 6/1994 | (JP) . |
| 08005394 | 1/1996 | (JP) . |
| 08016992 | 1/1996 | (JP) . |
| 08033028 | 2/1996 | (JP) . |
| 08043517 | 2/1996 | (JP) . |

* cited by examiner

*Primary Examiner*—Tracy Legree
*Assistant Examiner*—Charles Craver
(74) *Attorney, Agent, or Firm*—Helfgott & Karas, P.C.

(57) ABSTRACT

A mobile communication terminal includes a location information database storing location data and map data for each of the radio cell stations. When receiving a data request including an identification of a second mobile terminal from a first mobile terminal through a first radio cell station, the database is searched for first location data of the first radio cell station, second location data of a second radio cell station forming a micro cell in which the second mobile terminal is located, and map data for at least one of the first and second radio cell stations. Then the first and second location data and retrieved map data are transferred to the first mobile terminal through the first radio cell station and thereby a map and two locations corresponding to the first and second mobile terminals are displayed on screen based on the retrieved map data and the first and second location data.

15 Claims, 8 Drawing Sheets

LOCATION INFORMATION DATABASE

| CELL STATION | LONGITUDE | LATITUDE | MAP DATA | LOCATED TERMINAL |
|---|---|---|---|---|
| $CS_1$ | 140° 6' 52" E | 34° 56' 50" N | $MAP_1$ | $PS_1$ |
| $CS_2$ | a° b' c" E | d° e' f" N | $MAP_2$ | — |
| $CS_3$ | 139° 36' 11" E | 35° 43' 58" N | $MAP_3$ | $PS_2$ |
| $CS_4$ | 139° 40' 7" E | 35° 42' 8" N | $MAP_4$ | $PS_3$ |
| | | | | |

LOCATION REGISTRATION REQUEST

| MESSAGE TYPE | CS-ID | PS-ID |
|---|---|---|

FIG. 5B

LOCATION REGISTRATION RESPONSE

| MESSAGE TYPE | CS-ID | PS-ID | LONGI-TUDE | LATI-TUDE |
|---|---|---|---|---|

FIG. 5C

LOCATION DATA REQUEST

| MESSAGE TYPE | CS-ID | SOURCE PS-ID | DESIGNATED PS-ID |
|---|---|---|---|

FIG. 5D

LOCATION DATA RESPONSE

| MESSAGE TYPE | CS-ID | SOURCE PS-ID | DESIGNATED PS-ID | LONGI-TUDE | LATI-TUDE |
|---|---|---|---|---|---|

MAP DATA REQUEST

| MESSAGE TYPE | CS-ID | SOURCE PS-ID | DESIGNATED PS-ID | MAP DATA FORM SELECTION |
|---|---|---|---|---|

FIG. 7B

MAP DATA RESPONSE

| MESSAGE TYPE | CS-ID | SOURCE PS-ID | DESIGNATED PS-ID | MAP DATA |
|---|---|---|---|---|

MOBILE COMMUNICATIONS SYSTEM

BACKGROUND OF THE INVENTION

1. Field of the Invention

The present invention relates to a mobile communications system, and in particular to a micro-cellular communications system which performs call connections between mobile terminals.

2. Description of the Related Art

In mobile communications, a user having a mobile terminal therewith may move from one cell to another or between different service areas. Therefore, it is important to inform the user through the mobile terminal where it is located. A navigation system using GPS (Global Positioning System) has been known as such a location displaying system.

Further, a mobile navigation system combining a mobile communications system with the navigation system has been proposed in Japanese Patent Unexamined Publication No. 1-142899. More specifically, in the mobile navigation system, a mobile switching center is provided with a map information memory. When receiving the location information of a mobile terminal, the mobile switching center reads map information based on the location information from the map information memory and transmits it to that mobile terminal. Therefore, the mobile terminal can display the map information appropriate for the location on screen and the user can easily be informed where the user is.

SUMMARY OF THE INVENTION

In the case of calling, however, the calling user cannot know where the destination terminal is located. In other words, the conventional system cannot provide the location information of both sides of connection. Therefore, the calling and called users cannot be informed whether they are near. Further, the conventional mobile terminal needs the GPS receiver, resulting in increased amount of hardware and complicated circuit in the mobile terminal.

An object of the present invention is to provide a mobile communications system and a mobile terminal which can provide the location information of both the mobile terminal and another mobile terminal with reduced size and weight.

Another object of the present invention is to provide a mobile terminal which can receive and display the map information including the location of another mobile terminal.

According to the present invention, in a mobile communications system comprising a plurality of radio cell stations each forming a micro cell and performing call connections between mobile terminals, location data and map data for each of the radio cell stations are stored onto a database. When receiving a data request from a first mobile terminal through a first radio cell station, the data request including designation of a second mobile terminal, the database is searched for first location data of the first radio cell station, second location data of a second radio cell station forming a micro cell in which the second mobile terminal is located, and map data for at least one of the first and second radio cell stations. Then the first and second location data and retrieved map data are transferred to the first mobile terminal through the first radio cell station.

The first mobile terminal, when receiving the first and second location data and retrieved map data from the mobile communications system through the first radio cell station, displays a map and two locations corresponding to the first and second mobile terminals on screen based on the retrieved map data and the first and second location data.

DETAILED DESCRIPTION OF THE PREFERRED EMBODIMENTS

Figure 1:
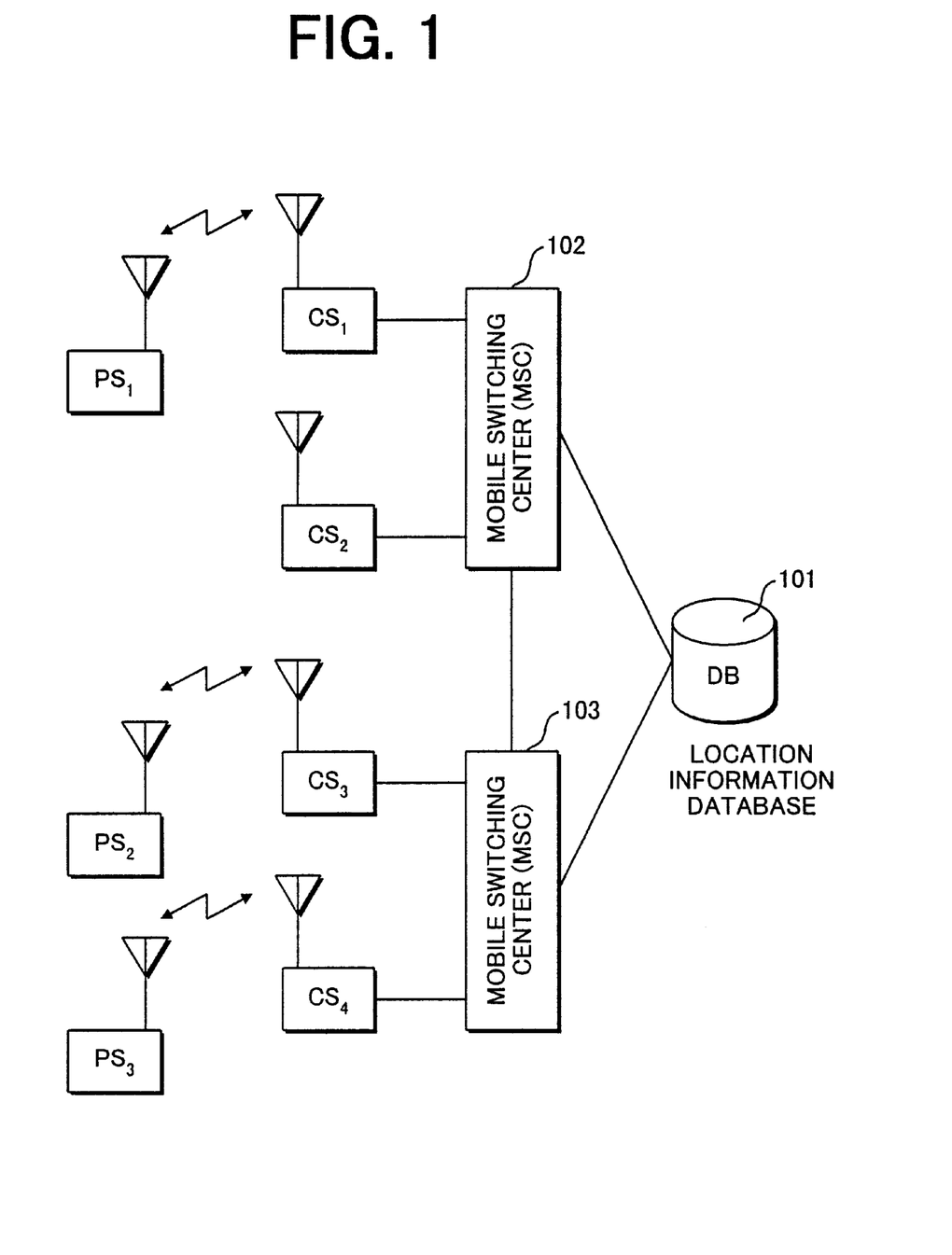
FIG. 1 is a block diagram showing a mobile communications system according to an embodiment of the present invention.

Referring to FIG. 1, a micro-cellular communications system is composed of a location information database 101, a plurality of mobile switching centers 102, 103, . . . , each having a plurality of radio cell stations connected thereto. Each radio cell station CS forms a micro cell of the order of 100 to 500 meters in which a mobile terminal (or a personal station) communicates with that radio cell station by radio. The radio cell stations are placed to cover the service area with their micro cells and each mobile terminal can move freely between micro cells. As will be described later, the location of a mobile terminal can be detected depending on which micro cell the mobile terminal is located in. Since each micro cell is of 100 to 500 meters diameter, the detected location of the mobile terminal has an error of 100–500 meters at the maximum.

It is assumed for simplicity that the location information database 101 can be shared between the mobile switching centers 102 and 103 and that radio cell stations $CS_1$ and $CS_2$ are connected to the mobile switching center 102 and radio cell stations $CS_3$ and $CS_4$ are connected to the mobile switching center 103. Further, it is assumed that mobile terminals $PS_1$, $PS_2$ and $PS_3$ are located in the micro cells of the cell stations $CS_1$, $CS_3$ and $CS_4$, respectively.

Figure 2:
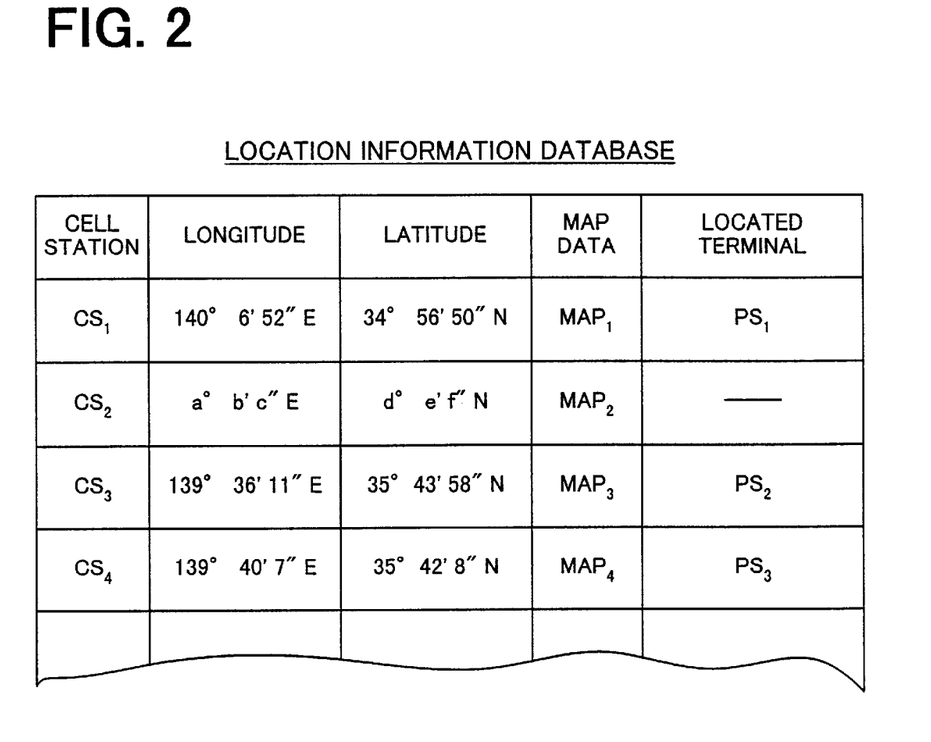
FIG. 2 is a diagram showing an example of a table stored in the location information database.

Referring to FIG. 2, the location information database 101 stores a location information table containing the location data, the map data, and the located terminal data for each cell station. In this embodiment, the location data is absolute location data of each cell station, such as a set of Longitude and Latitude, the map data is bitmap data of a predetermined area map on a scale of 1 to 50,000 in the vicinity of each radio cell station, and the located terminal data is the identification list of mobile terminals which are located in the micro cell of each radio cell station. For example, the absolute location of the radio cell station $CS_1$ is Longitude 140° 6' 52" E and Latitude 34° 56' 50" N, the map in the vicinity of the radio cell station $CS_1$ is formed with the bitmap data $MAP_1$, and the mobile terminal located in the micro cell of the radio cell station $CS_1$ is the mobile terminal $PS_1$.

The area size of each map is preferably set to more than 50 times the radius of each micro cell so as not to influence the error of location of each mobile terminal. As shown in FIG. 2, the radio cell stations $CS_3$ and $CS_4$ are relatively close to each other and the radio cell station $CS_1$ is far away from the radio cell stations $CS_3$ and $CS_4$. Therefore, the map areas of the radio cell stations $CS_3$ and $CS_4$ are overlapped and those of the radio cell station $CS_1$ and the radio cell station $CS_3$ or $CS_4$ are separate from each other.

Figure 3:
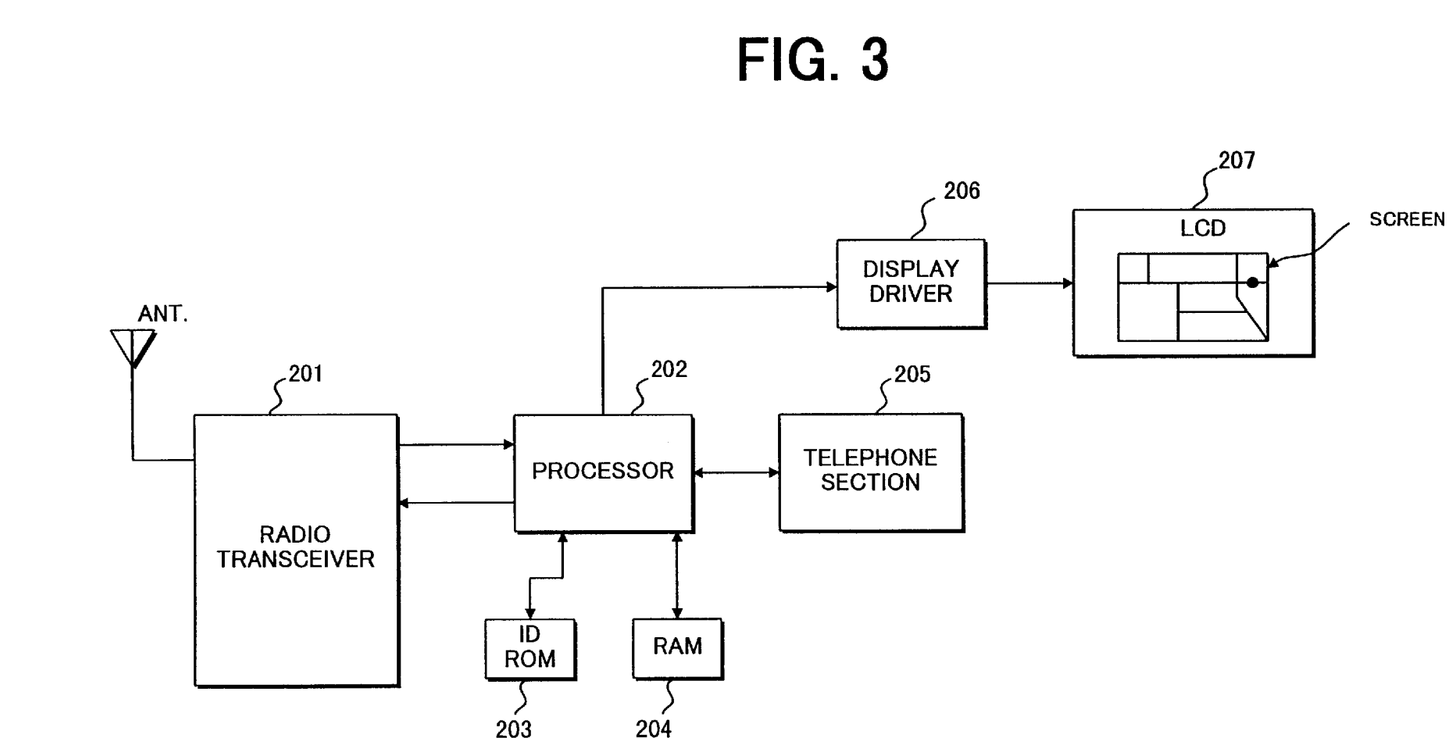
FIG. 3 is a block diagram showing a mobile terminal of the embodiment.

Referring to FIG. 3, a mobile terminal PS is comprised of an antenna and a radio transceiver 201 which transmits and receives a radio signal to and from a nearby radio cell station through the antenna. A processor 202 performs the operations of the mobile terminal including coding/decoding and other necessary operations for radio communication. An ID ROM (read-only memory) 203 stores an identification number such as a subscriber telephone number which is used to received data from the nearby radio cell station. A RAM (random access memory) 204 stores the map data and the absolute location data received from the location information database 101 through the mobile switching center and the nearby radio cell station.

As will be described later, the processor 202 performs the calling and called operations using the ID ROM 203 and the RAM 204 according to instructions received from a telephone section 205. The telephone section 205 includes a speech encoder/decoder, a speaker, a microphone and a keypad for dialing. The processor 202 further controls a display driver 206 to display the received map data and absolute location data on a display 207 such as a liquid-crystal display (LCD).

Operation

The respective radio cell stations $CS_1$ to $CS_4$ broadcast control signals in their micro cells at all times. The control signals include cell station identification numbers ($CD\text{-}ID_1$ to $CS\text{-}ID_4$) which are previously assigned to the radio cell stations $CS_1$ to $CS_4$, respectively.

Figure 4:
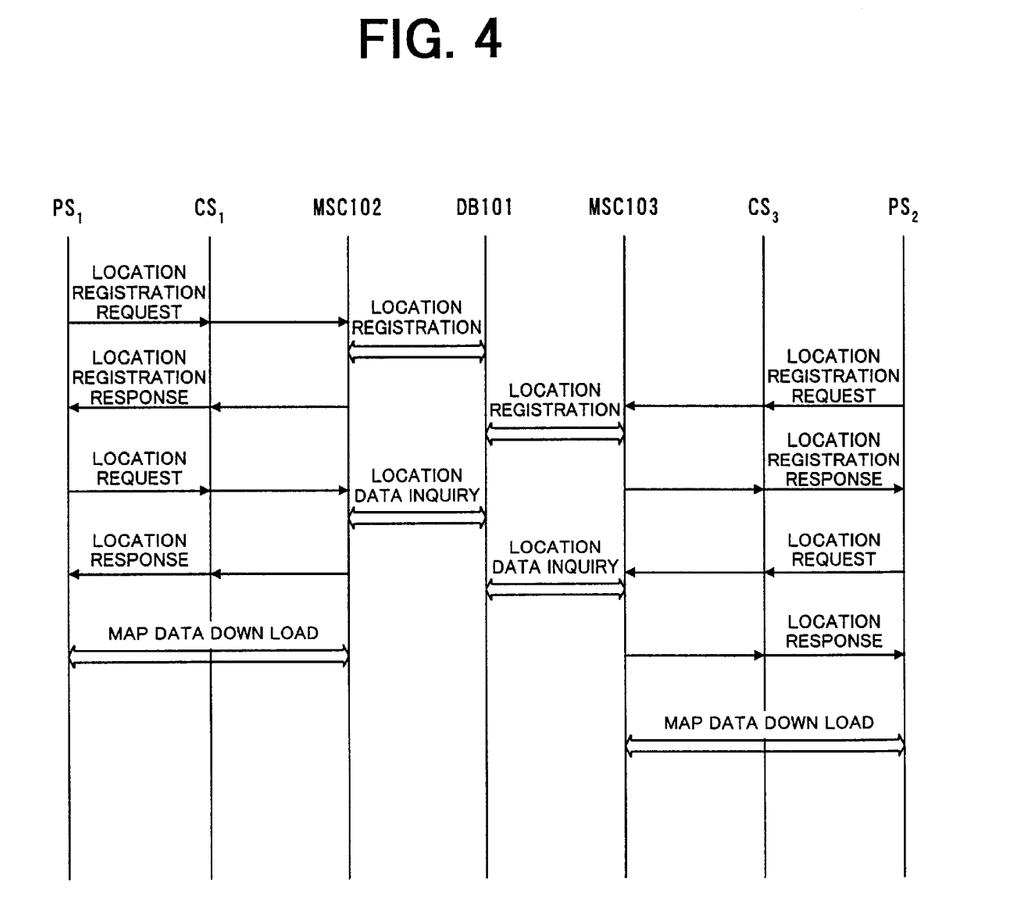
FIG. 4 is a sequence diagram showing an operation of the mobile communications system of FIG. 1.

Referring to FIGS. 4 and 5, when a mobile terminal (here, $PS_1$) moves from outside the service area into the micro cell of the radio cell station $CS_1$ or when the mobile terminal is powered on within the service area, the mobile terminal $PS_1$ receives the control signal from the radio cell station $CS_1$ and then transmits a location registration request message to the radio cell station $CS_1$. As shown in FIG. 5A, the location registration request message conveys the cell station ID number $CS\text{-}ID_1$ and the self ID number $PS\text{-}ID_1$.

Figure 5A:
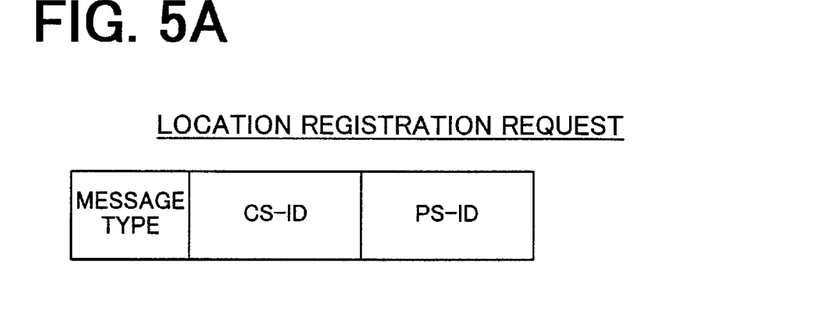
FIGS. 5A–5D are signal formats of data request messages used in the mobile communications system.
Figure 5B:
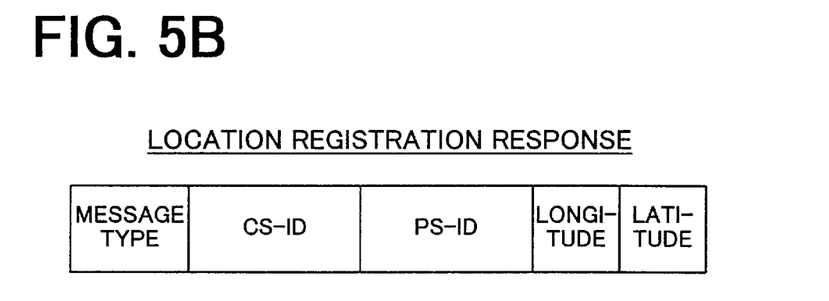

When receiving the location registration request message, the radio cell station $CS_1$ transfers it to the mobile switching center 102 which uses the location information database 101 to perform the location registration of the mobile terminal $PS_1$. This causes the database 101 to be updated such that the mobile terminal $PS_1$ is added to the located terminal field for the radio cell station $CS_1$. After that, the mobile switching center 102 reads the absolute location data of the radio cell station $CS_1$ from the database 101 and then transmits a location registration response message back to the mobile terminal $PS_1$. The location registration response message includes the absolute location data (here, Longitude 140° 6' 52" E and Latitude 34° 56' 50" N) as shown in FIG. 5B. When receiving the location registration response message from the radio cell station $CS_1$, the processor 202 of the mobile terminal $PS_1$ stores the absolute location data included in the location registration response message as the location data thereof onto the RAM 204.

Figure 5C:
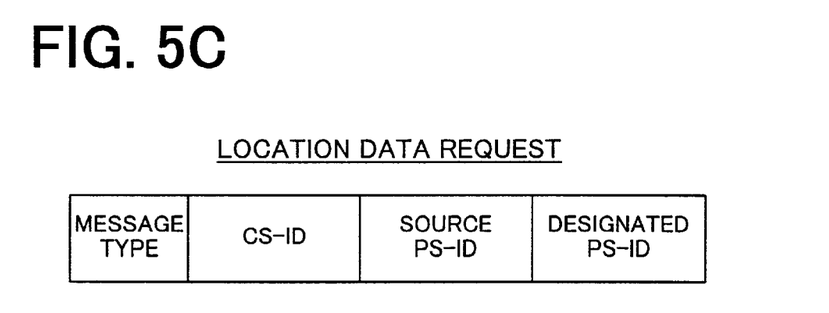

In the case where a user wants to know the location of another mobile terminal, the user uses the keypad to designate the ID number of the mobile terminal (for example, $PS_2$) and start calling, which causes a location data request message to be transmitted to the radio cell station $CS_1$. The first terminal is the calling terminal and the second terminal is the called terminal. As shown in FIG. 5C, the location data request message conveys the cell station ID number $CS\text{-}ID_1$, the self ID number $PS\text{-}ID_1$, and the designated ID number $PS\text{-}ID_2$.

When receiving the location data request message, the radio cell station $CD_1$ transfers it to the mobile switching center 102 which in turn inquires from the location information database 101 whether the designated terminal $PS_2$ is now located in the service area, that is, the designated ID number $PS\text{-}ID_2$ is registered in the location information database 101.

Figure 5D:
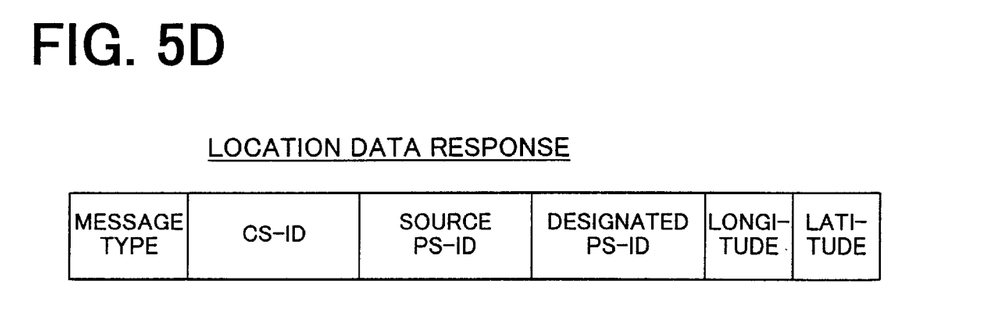

If the designated terminal $PS_2$ is located in the service area, the absolute location data of the designated terminal $PS_2$ (here, Longitude 139° 36' 11" E and Latitude 35° 43' 58" N) is read from the database 101 and then a location information response message is transmitted back to the mobile terminal $PS_1$. The location information response message includes the absolute location data of the designated terminal $PS_2$ as shown in FIG. 5D. When receiving the location information response message from the radio cell station $CS_1$, the processor 202 of the mobile terminal $PS_1$ stores the absolute location data included in the location information response message as the location data of the designated terminal $PS_2$ onto the RAM 204. If the designated terminal $PS_2$ is not located in the service area, another location information response message indicating that the designated terminal is outside the service area is transmitted back to the mobile terminal $PS_1$.

After the location data of the self terminal and the designated terminal are received, the map data $MAP_1$ in the vicinity of the radio cell station $CS_1$ is downloaded from the database 101 to the mobile terminal $PS_1$. In this case, the mobile terminal $PS_1$ may transmit a map data request message and receive a map data response message conveying the map data $MAP_1$ (see FIGS. 7A and 7B). The processor 202 of the mobile terminal $PS_1$ stores the received map data onto the RAM 204 and then displays the map together with the locations of the self terminal $PS_1$ and the designated terminal $PS_2$ on the display 207.

The other mobile terminals can perform the same sequence as described above. In FIG. 4, the sequence performed by the mobile terminal $PS_2$ is shown as an example. The mobile terminal $PS_2$ can display the map in the vicinity of the radio cell station $CS_3$ together with the locations of the self terminal $PS_2$ and another terminal on screen.

Figure 6A:
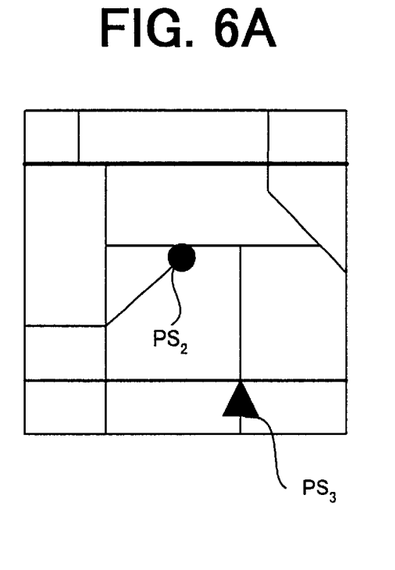
FIG. 6A is a schematic diagram showing an example of display screen in the mobile terminal $PS_2$.
Figure 6B:
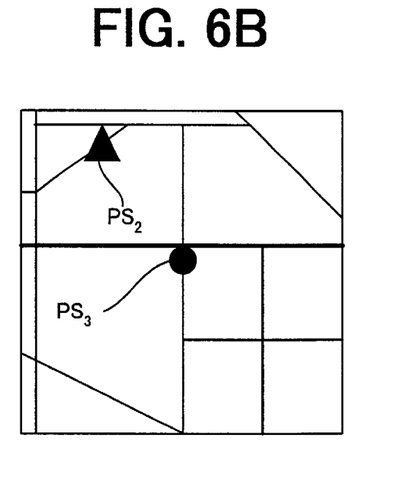
FIG. 6B is a schematic diagram showing an example of display screen in the mobile terminal $PS_3$; in the case as in FIG. 6A.
Figure 6C:
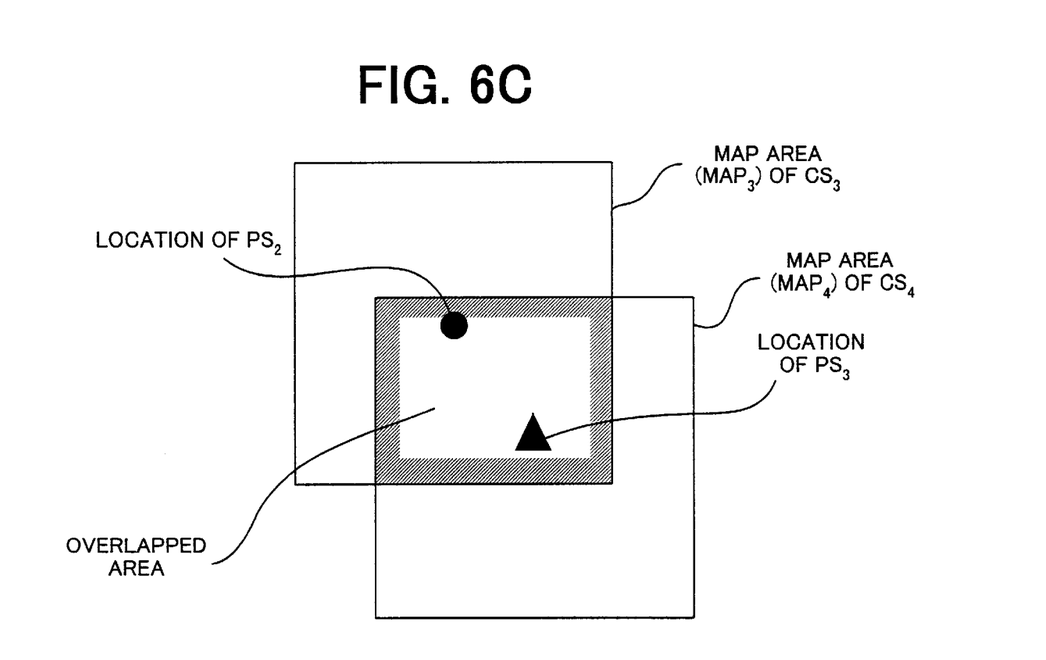
FIG. 6C is a schematic diagram showing an overlapped area of two adjacent map areas.

FIG. 6A shows a displayed map in the mobile terminal $PS_2$ when it designates the mobile terminal $PS_3$ and FIG. 6B shows a displayed map in the mobile terminal $PS_3$ when it designates the mobile terminal $PS_2$. In the displayed map of the mobile terminal $PS_2$ as shown in FIG. 6A, the location of the mobile terminal $PS_2$ itself is displayed in the approximate center of the screen and the location of the designated mobile terminal $PS_3$ is displayed in the lower-right portion of the same screen. On the other hand, in the displayed map of the mobile terminal $PS_3$ as shown in FIG. 6B, the location of the mobile terminal $PS_3$ itself is displayed in the approximate center of the screen and the location of the designated mobile terminal $PS_2$ is displayed in the upper-left portion of the same screen. The displayed maps as shown in FIGS. 6A and 6B are obtained in the case where both the mobile terminals $PS_2$ and $PS_3$ are located in the overlapped area of the respective map areas of the radio cell stations $CS_2$ and $CS_3$ as shown in FIG. 6C.

A mobile terminal can receive not only the map data in the vicinity of the radio cell station connected thereto but also the map data in the vicinity of another radio cell station connected to a designated mobile terminal. And a desired map can be selected and displayed on screen by a user's instruction.

Figure 7A:
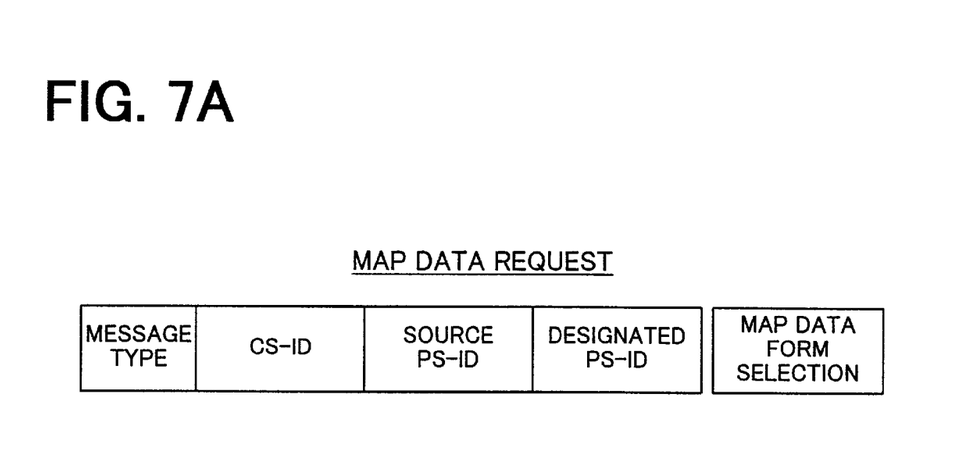
FIGS. 7A and 7B are signal formats of map data request messages used in the mobile communications system.
Figure 7B:
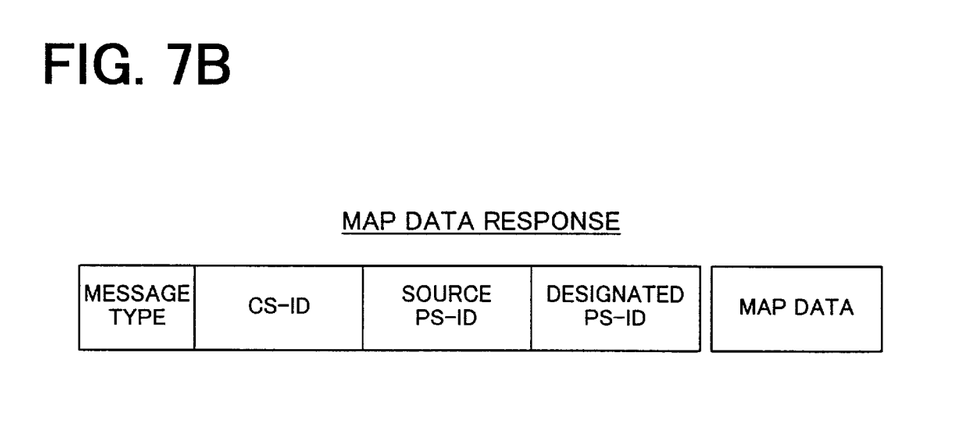

As shown in FIGS. 7A and 7B, in the case where a user of the mobile terminal $PS_2$ wants to receive the map of another radio cell station connected to a designated mobile terminal $PS_3$, the user uses the keypad to designate the ID number of the mobile terminal $PS_3$ and start calling, which causes a map data request message to be transmitted to the radio cell station $CS_3$. The map data request message conveys the cell station ID number $CS$-$ID_3$, the self ID number $PS$-$ID_2$, the designated ID number $PS$-$ID_3$, and a map data type. The map data type is used to select one of the self map, the designated terminal map, and a combination thereof.

When receiving the map data request message, the radio cell station $CS_3$ transfers it to the mobile switching center 103 which in turn inquires from the location information database 101 whether the designated terminal $PS_3$ is now located in the service area, that is, the designated ID number $PS$-$ID_3$ is registered in the location information database 101. If the designated terminal $PS_3$ is located in the service area, the absolute location data of the designated terminal $PS_3$ and its map data $MAP_4$ are read from the database 101 and then are transmitted back to the mobile terminal $PS_2$. The processor 202 of the mobile terminal $PS_2$ stores the absolute location data and the map data of the designated terminal $PS_3$ onto the RAM 204. It is the same with the mobile terminal $PS_3$. In this manner, the same map is displayed on the respective displays of the mobile terminals $PS_2$ and $PS_3$ as shown in FIGS. 8A and 8B.

Figure 8A:
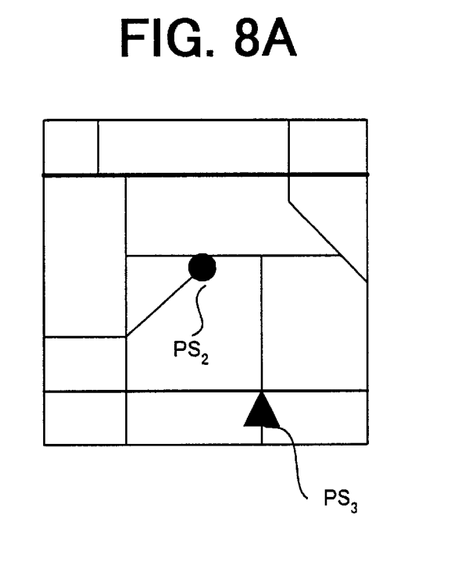
FIG. 8A is a schematic diagram showing another example of display screen in the mobile terminal $PS_2$.
Figure 8B:
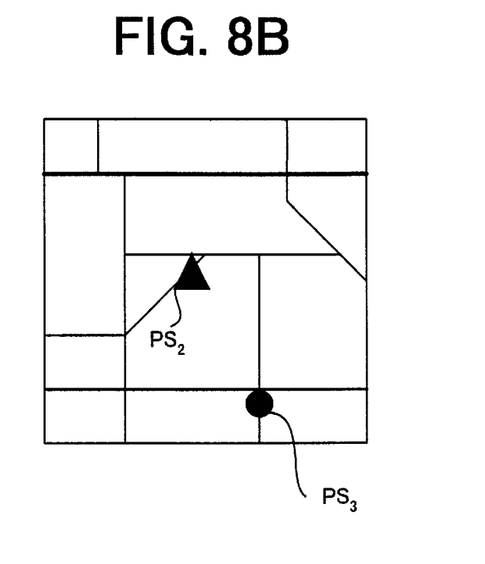
FIG. 8B is a schematic diagram showing another example of display screen in the mobile terminal $PS_3$; in the case as in FIG. 8A.

FIG. 8A shows a displayed map in the mobile terminal $PS_2$ when it receives the map data $MAP_4$ in the vicinity of the radio cell station $CS_4$ connected thereto. FIG. 8B shows a displayed map in the mobile terminal $PS_3$ when it receives the map data $MAP_4$ in the vicinity of the radio cell station $CS_4$ connected to the designated mobile terminal $PS_3$.

In this case, since the same map is displayed on the respective displays of the mobile terminals $PS_2$ and $PS_3$, each mobile terminal can easily display route information such as required time and distance between these locations using the absolute location data with an error of 100–500 meters at the maximum. Needless to say, such concurrent displaying is obtained in the case where both the mobile terminals $PS_2$ and $PS_3$ are located in the overlapped area of the respective map areas of the radio cell stations $CS_2$ and $CS_3$ as shown in FIG. 6C. Usually, these mobile terminals are located in different areas which are not overlapped.

Figure 9:
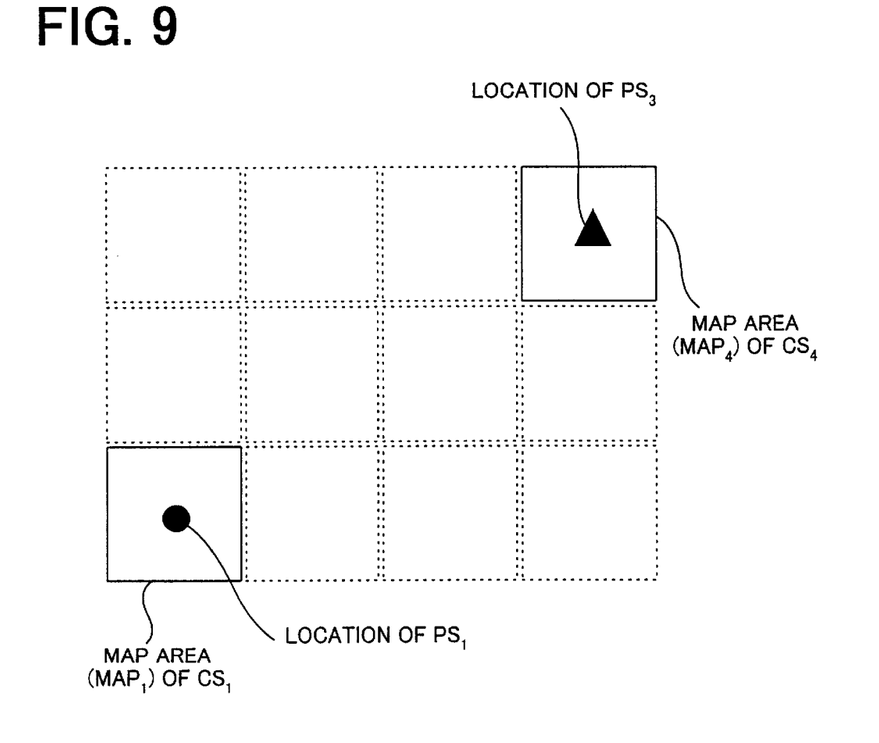
FIG. 9 is a schematic diagram showing a map area arrangement to be retrieved in the case where two map areas are separated.

Referring to FIG. 9, the mobile terminal $PS_1$ is away from the mobile terminal $PS_3$ and therefore the area map $MAP_1$ in the vicinity of the radio cell station $CS_1$ does not overlap with the area map $MAP_4$ in the vicinity of the radio cell station $CS_4$. In this case, the mobile terminal $PS_1$ can display one selected from the area map $MAP_1$ and the area map $MAP_4$ on screen as described above.

Further, the mobile terminal $PS_1$ can display the reduced maps of the area map $MAP_1$ and $MAP_4$ on screen. Since the absolute locations of the radio cell stations $CS_1$ and $CS_4$ have been received, the processor 202 of the mobile terminal $PS_1$ can calculate route information such as a distance and a required time between them.

Furthermore, in the case where the location information database 101 stores the area maps between the radio cell stations $CS_1$ and $CS_4$ as shown in FIG. 9, the location information database 101 can reduce these area maps and transmit the reduced area map to the mobile terminal $PS_1$ together with the corresponding absolute locations. In this case, the mobile terminal $PS_1$ can display the reduced map between the area maps $MAP_1$ and $MAP_4$ on screen and further can calculate route information such as a traveling distance and a required time between them.

What is claimed is:

1. In a mobile communications system comprising a plurality of radio cell stations each forming a micro cell, the mobile communication system performing call connections between mobile terminals, a method for transferring location information to a mobile terminal, comprising the steps of:

a) storing location data and map data for each of the radio cell stations onto a database;

b) receiving a data request from a first mobile terminal through a first radio cell station, the data request including designation of a second mobile terminal;

c) retrieving first location data of the first radio cell station, second location data of a second radio cell station forming a micro cell in which the second mobile terminal is located, and map data for at least one of the first and second radio cell stations from the database in response to the data request; and d) transferring the first and second location data and retrieved map data to the first mobile terminal through the first radio cell station wherein said first mobile terminal is a calling terminal and said second mobile terminal is a called terminal;

the first location data and the second location data including absolute location data for the first radio cell station and the second radio cell station, respectively, the first location data and the second location data not including any data specifying a location of the first mobile terminal or a location of the second mobile terminal other than the absolute location data for the first radio cell station included in the first location data and the absolute location data for the second radio cell station included in the second location data.

2. The method according to claim 1, wherein the data request further includes form selection of map data which is used to select the retrieved map data from first map data for the first radio cell station, second map data for the second radio cell station, and a combination of the first and second map data.

3. The method according to claim 1, wherein the steps b) and c) comprise the steps of:

receiving a location registration request from the first mobile terminal through the first radio cell station, the location registration request including a first identification of the first mobile terminal;

retrieving first location data of the first radio cell station from the database in response to the location registration request;

receiving a location data request from the first mobile terminal through the first radio cell station, the location data request including a first identification of the first mobile terminal and a second identification of the second mobile terminal;

retrieving the second location data of the second radio cell station from the database in response to the location data request;

receiving a map data request from the first mobile terminal through the first radio cell station, the map data request including a first identification of the first mobile terminal, a second identification of the second mobile terminal, and a map data form; and retrieving the map data for at least one of the first and second radio cell stations depending on the map data form from the database in response to the map data request.

4. The method according to claim 3, wherein the map data form is used to select the retrieved map data from first map data for the first radio cell station, second map data for the second ratio cell station, and a combination of the first and second map data.

5. In a mobile communications system comprising a plurality of radio cell stations each forming a micro cell, the mobile communication system performing call connections between mobile terminals, a method for transferring location information to a mobile terminal, comprising the steps of:

a) storing location data and map data for each of the radio cell stations onto a database;

b) receiving a data request from a first mobile terminal through a first radio cell station, the data request including designation of a second mobile terminal;

c) retrieving first location data of the first radio cell station, second location data of a second radio cell station forming a micro cell in which the second mobile terminal is located, and map data for at least one of the first and second radio cell stations from the database in response to the data request; and transferring the first and second location data and retrieved map data to the first mobile terminal through the first radio cell station, wherein the steps c) and d) comprise the steps of:

retrieving the first location data, the second location data, first map data for at least one of the first and second radio cell stations, and second map data for at least one radio cell station located between the first and second radio cell stations from the database in response to the data request; and transferring the first and second location data and retrieved first and second map data to the first mobile terminal through the first radio cell station.

6. A map displaying method for displaying a map on screen in a mobile terminal which is registered in a mobile communications system comprising a plurality of radio cell stations each forming a micro cell, the mobile communication system performing call connections between mobile terminals, the method comprising the steps of:

at the mobile communications system, a) storing location data and map data for each of the radio cell stations onto a database;

b) receiving a data request from a first mobile terminal through a first radio cell station, the data request including designation of a second mobile terminal said first mobile terminal is a calling terminal and said second mobile terminal is a called terminal; and c) retrieving first location data of the first radio cell station, second location data of a second radio cell station forming a micro cell in which the second mobile terminal is located, and map data for at least one of the first and second radio cell stations from the database in response to the data request;

at the first mobile terminal, d) receiving the first and second location data and retrieved map data from the mobile communications system through the first radio cell station; and e) displaying a map and two locations corresponding to the first and second mobile terminals on screen based on the retrieved map data and the first and second location data, second location data, first map data for at least one of the first and second radio cell stations, and second map data for at least one radio cell station located between the first and second radio cell stations from the database in response to the data request, the steps d) and e) comprise the steps of:

receiving the first and second location data and retrieved first and second map data from the mobile communications system through the first radio cell station; and displaying a map and two locations corresponding to the first and second mobile terminals on screen based on the retrieved first and second map data and the first and second location data;

the first location data and the second location data including absolute location data for the first radio cell station and the second radio cell station, respectively, the first location data and the second location data not including any data specifying a location of the first mobile terminal or a location of the second mobile terminal other than the absolute location data for the first radio cell station included in the first location data and the absolute location data for the second radio cell station included in the second location data.

7. The method according to claim 6, wherein the data request further includes form selection of map data which is used to select the retrieved map data from first map data for the first radio cell station, second map data for the second radio cell station, and a combination of the first and second map data.

8. A map displaying method for displaying a map on screen in a mobile terminal which is registered in a mobile communications system comprising a plurality of radio cells stations each forming a micro cell, the mobile communication system performing call connections between mobile terminals, the method comprising the steps of:

at the mobile communications system, a) storing location data and map data for each of the radio cell stations onto a database;

b) receiving a data request from a first mobile terminal through a first radio cell station, the data request including designation of a second mobile terminal; and c) retrieving first location data of the first radio cell station, second location data of a second radio cell station forming a micro cell in which the second mobile terminal is located, and map data for at least one of the first and second radio cell stations from the database in response to the data request;

at the first mobile terminal, d) receiving the first and second location data and retrieved map data from the mobile communications system through the first radio cell station; and e) displaying a map and two locations corresponding to the first and second mobile terminals on screen based on the retrieved map data and the first and second location data, wherein the step c) comprises the step of retrieving the first location data, the second location data, first map data for at least one of the first and second radio cell stations, and second map data for at least one radio cell station located between the first and second radio cell stations from the database in response to the data request, the steps d) and e) comprise the steps of:

receiving the first and second location data and retrieved first and second map data from the mobile communications system through the first radio cell station; and displaying a map and two locations corresponding to the first and second mobile terminals on screen based on the retrieved first and second map data and the first and second location data.

9. A mobile terminal of a mobile communications system comprising a plurality of radio cell stations each forming a micro cell, the mobile communication system performing call connections between mobile terminals and having a database for storing location data and map data for each of the radio cell stations, a first mobile terminal comprising:

a transceiver for transmitting a data request to the mobile communication system through a nearby first radio cell station, the data request including designation of a second mobile terminal and for receiving first and second location data and retrieved map data from the database of the mobile communications system through the nearby radio cell station, the first location data including absolute location data for the nearby first radio cell station, the second location data including absolute location data for a second radio cell station forming a micro cell in which the second mobile terminal is located, and the retrieved map data being of at least one of the first and second radio cell stations, the first mobile terminal is a calling terminal and the second mobile terminal is a called terminal; and a display controller for displaying a map and two locations corresponding to the first and second mobile terminals on screen based on the retrieved map data and the first and second location data;

the first location data and the second location data not including any data specifying a location of the first mobile terminal or a location of the second mobile terminal other than the absolute location data for the nearby first radio cell station and the absolute location data for the second radio cell station.

10. The first mobile terminal according to claim 9, wherein the data request further includes form selection of map data which is used to select the retrieved map data from first map data for the first radio cell station, second map data for the second radio cell station, and a combination of the first and second map data.

11. The first mobile terminal according to claim 10, wherein, when the retrieved map data is the first map data, the first map data is displayed with at least the location of the first mobile terminal.

12. A mobile terminal of a mobile communications system comprising a plurality of radio cell stations each forming a micro cell, the mobile communication system performing call connections between mobile terminals and having a database for storing location data and map data for each of the radio cell stations, the mobile terminal comprising:

a transceiver for transmitting a data request to the mobile communication system through a nearby radio cell station, the data request including designation of another mobile terminal and for receiving first and second location data and retrieved map data from the database of the mobile communications system through the nearby radio cell station, the first location data being of the nearby radio cell station, the second location data being of a second radio cell station forming a micro cell in which the other mobile terminal is located, and the retrieved map data being of at least one of the first and second radio cell stations; and a display controller for displaying a map and two locations corresponding to the first and second mobile terminals on screen based on the retrieved map data and the first and second location data, wherein the data request further includes form selection of map data which is used to select the retrieved map data from first map data for the first radio cell station, second map data for the second radio cell station, and a combination of the first and second map data and wherein, when the retrieved map data is the combination of the first and second map data, the combination is displayed such that one screen is divided into a plurality of parts displaying the first and second map data with the locations of the first and second mobile terminals, respectively.

13. A mobile terminal of a mobile communications system comprising a plurality of radio cell stations each forming a micro cell, the mobile communication system performing call connections between mobile terminals and having a database for storing location data and map data for each of the radio cell stations, the mobile terminal comprising:

a transceiver for transmitting a data request to the mobile communication system through a nearby radio cell station, the data request including designation of another mobile terminal and for receiving first and second location data and retrieved map data from the database of the mobile communications system through the nearby radio cell station, the first location data being of the nearby radio cell station, the second location data being of a second radio cell station forming a micro cell in which the other mobile terminal is located, and the retrieved map data being of at least one of the first and second radio cell stations; and a display controller for displaying a map and two locations corresponding to the first and second mobile terminals on screen based on the retrieved map data and the first and second location data, wherein the transceiver receives the first location data, the second location data, first map data for at least one of the first and second radio cell stations, and second map data for at least one radio cell station located between the first and second radio cell stations from the database of the mobile communications system through the nearby radio cell station; and the display controller for displaying a map and two locations corresponding to the first and second mobile terminals on screen based on the retrieved first and second map data and the first and second location data.

14. A mobile communications system comprising:

a plurality of radio cell stations each forming a micro cell, the mobile communication system performing call connections between mobile terminals through a plurality of radio cell stations;

a database for storing location data and map data for each of the radio cell stations; and a controller for retrieving first location data including absolute location data for a first radio cell station forming a micro cell in which a first mobile terminal is located, second location data including absolute location data for a second radio cell station forming a micro cell in which a second mobile terminal is located, and map data for at least one of the first and second radio cell stations from the database in response to a data request received from the first mobile terminal through the first radio cell station, and for transferring the first and second location data and retrieved map data to the first mobile terminal through the first radio cell station wherein the first mobile terminal is a calling terminal and a second mobile terminal is a called terminal;

the first location data and the second location data not including any data specifying a location of the first mobile terminal or a location of the second mobile terminal other than the absolute location data for the first radio cell station and the absolute location data for the second radio cell station.

15. The mobile communications system according to claim 14, wherein the data request further includes form selection of map data which is used to select the retrieved map data from first map data for the first radio cell station, second map data for the second radio cell station, and a combination of the first and second map data.

* * * * *